B. C. HEATER.
PALLET LAYING AND ELEVATING MACHINE.
APPLICATION FILED AUG. 8, 1910.

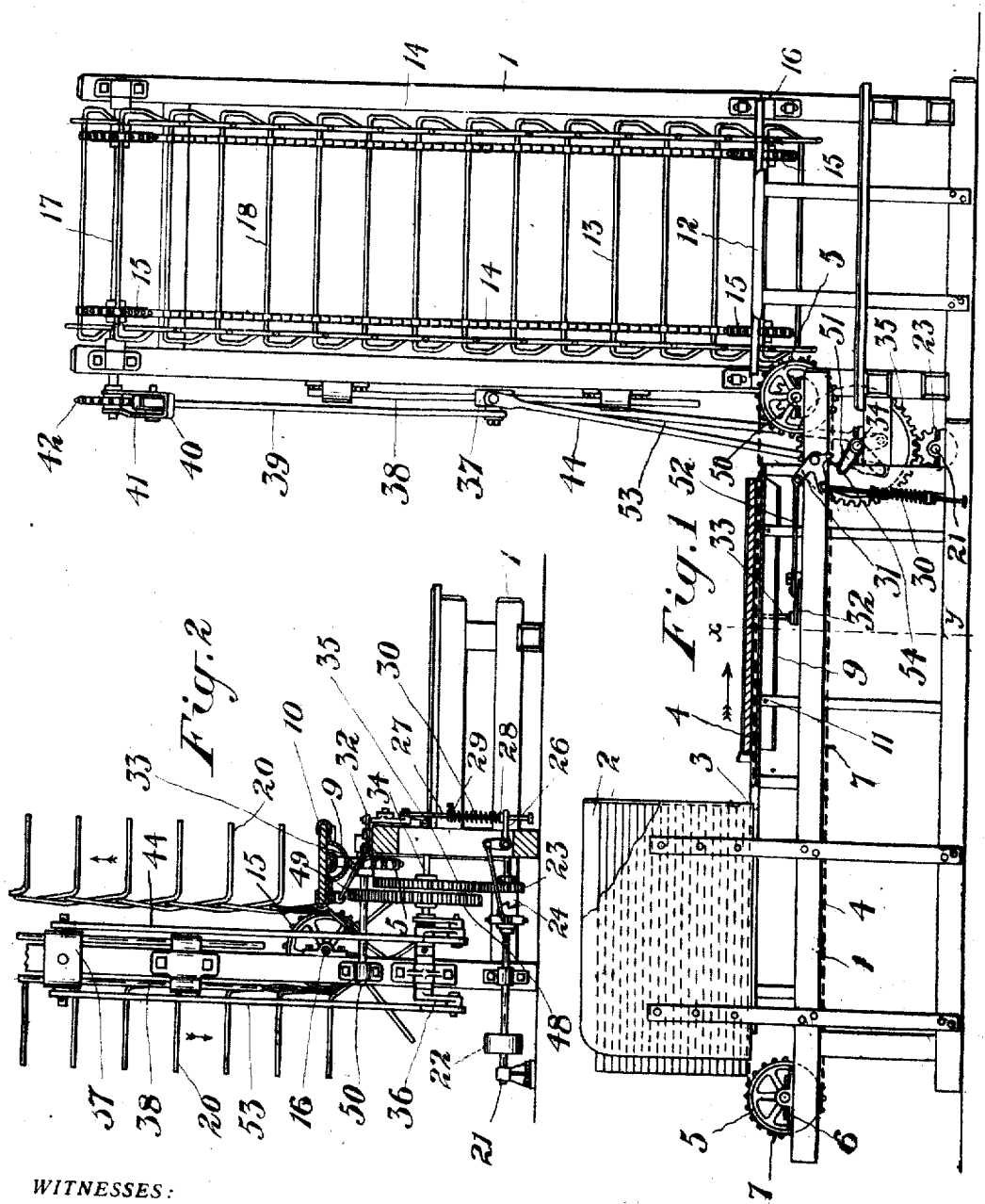

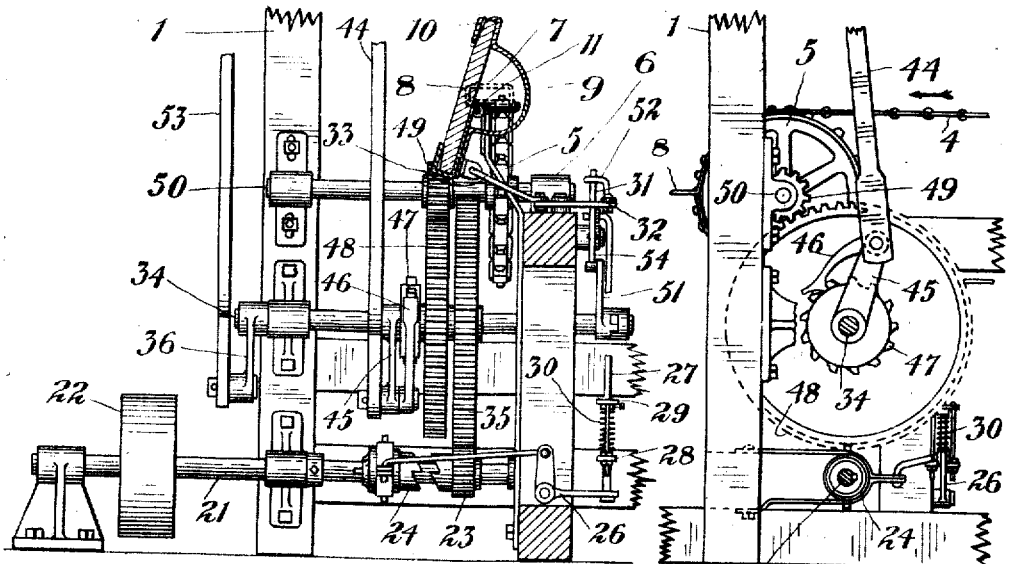

1,009,411.

Patented Nov. 21, 1911.
3 SHEETS—SHEET 3.

WITNESSES,

INVENTOR.
B. C. Heater
BY
ATTORNEY.

UNITED STATES PATENT OFFICE.

BERTNEY C. HEATER, OF MINTO TOWNSHIP, ONTARIO, CANADA.

PALLET LAYING AND ELEVATING MACHINE.

1,009,411. Specification of Letters Patent. Patented Nov. 21, 1911.

Application filed August 8, 1910. Serial No. 576,235.

*To all whom it may concern:*

Be it known that I, BERTNEY C. HEATER, of the township of Minto, (post-office, Drew,) in the Province of Ontario, Canada, have invented certain new and useful Improvements in Pallet Laying and Elevating Machines, of which the following is a specification.

This invention relates to machines for automatically placing pallets in position to receive the molds of brick and for carrying away and elevating the filled pallets in a convenient position to be taken off to the drying racks.

I attain my object by mechanism which may be briefly described as follows:—From a suitable magazine pallets are drawn one by one through the agency of an inclosed carrier. As soon as a pallet reaches a predetermined position it enters a pallet holder and is tilted on edge to a convenient position to have a mold of bricks placed upon it. The tilting of the pallet holder stops the driving mechanism which again starts as soon as the pallet holder is returned to its normal position. The pallet of bricks is then drawn forward out of the pallet holder onto a table from which it is lifted by an endless elevator provided with a series of pairs of arms adapted to engage beneath the pallets. The parts and the drive are so proportioned that one pallet is lifted before the next starts to leave the holder.

Figure 7:
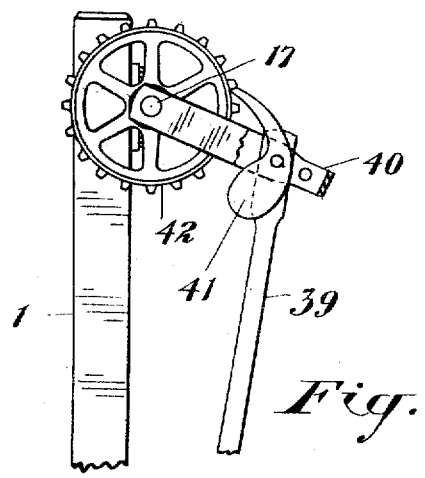
Figure 9:
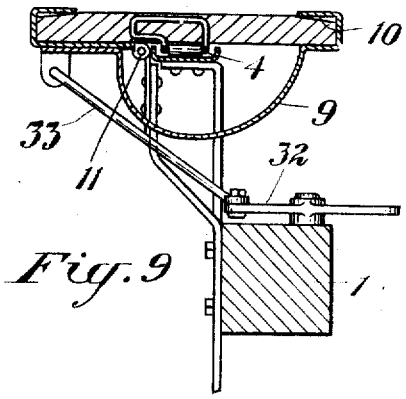
Figure 8:
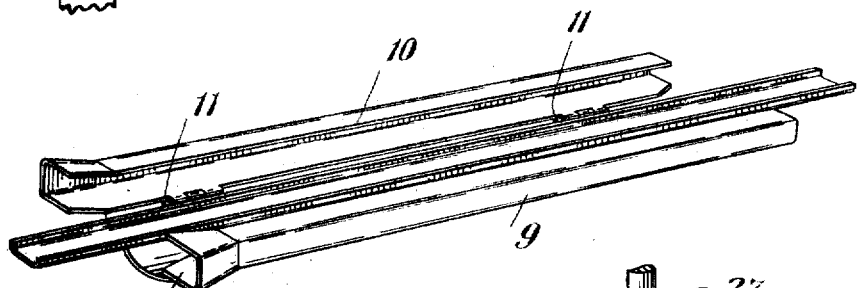
Figure 10:
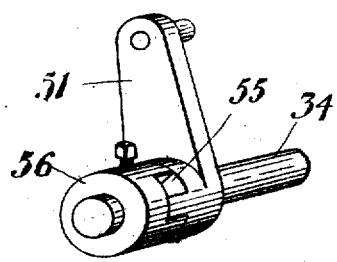
Figure 11:
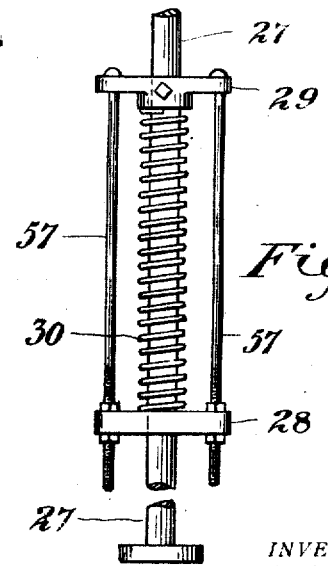

Figure 1 is a front elevation partly in section of the apparatus. Fig. 2 is a cross section on the line *x y* in Fig. 1, showing part only of the lifting mechanism. Fig. 3 is an enlarged detail of the gearing shown in Fig. 2 with the parts in a different position. Fig. 4 is a side elevation of the gearing taken from the left hand side of Fig. 3. Fig. 5 is a front elevation of a portion of the elevator. Fig. 6 is a side elevation of the same. Fig. 7 is a detail in side elevation of the elevator-actuating pawl and ratchet device. Fig. 8 is a perspective detail of the pallet holder. Fig. 9 is an enlarged section of the pallet holder. Fig. 10 is a perspective detail of the pallet holder actuating wiper. Fig. 11 is a detail in side elevation of the spring of the clutch shifting mechanism.

In the drawings like figures of reference indicate corresponding parts in the different figures.

1 is the frame of the machine suitably shaped to support the different parts. At one end of this frame is supported the pallet magazine 2. This magazine has an opening 3 in its front end through which pallets may be drawn one by one in a well known manner. An endless carrier 4 is carried by the sprocket wheels 5 journaled on the frame. One of these sprocket wheels, preferably that at the left hand in Fig. 1, has its bearings so connected with the frame that slack in the carrier may be taken up when necessary. I show for this purpose the bearings connected with the frame by an ordinary bolt and slot connection 6, though other means may, of course, be employed for the purpose. The carrier 4 is preferably a sprocket chain and certain of the links at appropriate intervals are provided with carrier lugs 7 projecting outwardly therefrom. These lugs have preferably a lateral extension 8, as shown particularly in Fig. 3, the purpose of which will shortly appear. The purpose of the carrier 4 is to draw pallets from the magazine one by one to the pallet holder 9 and thence to an elevator as will hereinafter appear.

The pallet holder 9 it will be seen is provided at opposite edges with the guides 10 for the pallet. The holder is also hinged at 11 on the frame 1, so that it may be tilted to the position shown in Fig. 3 in order that a mold of bricks may be applied to the pallet. The holder is then returned to its normal position. After being loaded while in the pallet holder, the pallet is drawn forward by the carrier to the table 12 from which it is lifted by the endless elevator 13. This elevator must be of special construction in order that there shall be sufficient space for the pallet of bricks between adjacent load receiving members without having the latter too far apart, and must also possess stiffness in its vertical sections without interference with the bending of its sections around the driving and supporting members. I attain these characteristics by the following construction: 14 are sprocket chains running on the sprocket wheels 15 on the shaft 16 at the lower end of the elevator and 17 at the upper end of the elevator. These shafts are journaled in a vertical extension of the frame 1. The elevator is provided with a series of sections each comprising a cross bar 18 carried by the chains 14, two side bars 19 and two fingers 20, preferably formed of bent rod. The side bars are each bent to pass under the next adjacent cross bar 18 and over the second adjacent cross bar, as shown particularly in Figs. 5 and 6. This arrangement makes the elevator substantially rigid against pressure from the front which is an important feature when the elevator is subsequently unloaded. At the same time each section bends freely around the sprocket wheels 15, as shown particularly in Figs. 2 and 6 and the sections will not fall forward when they pass over the upper sprocket wheels to move downwardly to pallet loading position again.

It is desirable that the carrier 4 and the elevator 13 be intermittently moved, the movement of the carrier taking place while the elevator is stationary and vice versa. It is also desirable that the carrier mechanism should stop during the operation of loading a pallet while it is in the holder 9. To accomplish the desired results I provide the following driving mechanism: 21 is the driving shaft which is provided with a suitable driving pulley 22. On this shaft is a loose gear pinion 23. An ordinary clutch 24 is provided whereby a driving connection may be formed between the gear pinion and the shaft. This clutch is provided with an ordinary shifter mechanism connected with one arm of the bell crank lever 26. The other arm of this bell crank lever is connected with a rod 27 which preferably passes through the end of the lever. A loose collar 28 is provided on the rod 27 and between the loose collar 28 and the adjustable collar 29 is placed a coil spring 30. This rod 27 is pivotally connected with one arm of a bell crank lever 31. The other arm of this bell crank lever 31 is connected by a rod 52 with one arm of a bell crank lever 32 which by means of a rod 33 is connected with the pallet holder 9. The rocking of the pallet holder to a vertical position will thus through the medium of the spring actuated collar 28, throw the clutch 24 out of gear and stop the driving of the apparatus. While this tilting of the pallet holder might be done by hand I prefer that it shall be accomplished automatically as will hereinafter appear.

The power to operate the carrier and the elevator is taken from the pinion 23 by the following mechanism: 34 is a countershaft on which is secured the gear wheel 35 meshing with the pinion 23. On the end of the shaft 34 is secured a crank arm 36. By means of a suitable connecting rod 53 this crank arm actuates a cross head 37 sliding on the guides 38. This cross head has connected therewith the connecting rod 39, the other end of which is connected with the rock arm 40 pivoted on the shaft 17 and carrying a dog 41 engaging the ratchet wheel 42 secured to the said shaft 17. The shaft 17 is held as moved, through the medium of a gravity dog 43 preferably engaging one of the sprocket wheels 15 as shown particularly in Fig. 6.

The intermittent movement of the carrier 4 is obtained from the cross head 37. For this purpose I connect with the cross head a connecting rod 44, the lower end of which is connected with a rock arm 45 loose on the counter shaft 34. This rock arm carries a pawl 46 adapted to engage the ratchet wheel 47 secured to or forming part of the gear wheel 48 loose on the shaft 34. This gear wheel 48 meshes with the pinion 49 secured to the shaft 50 on which is secured the forward sprocket wheel 5. The reciprocation of the cross head 37 thus imparts an intermittent movement to the carrier, and as the upward movement of the cross head 37 actuates the elevator and its downward movement the endless carrier the movements of these two parts of the structure are alternated as previously described.

To tilt the pallet holder I secure at the end of the counter shaft a wiper 51 adapted to engage a projection 54 on the bell crank lever 31 which it rocks and then passes.

The operation of the device is substantially as follows:—The drive shaft being belted up to a suitable source of power, and the clutch being in gear, the mechanism starts and a pallet is drawn from the lower end of the magazine 2. As a pallet approaches its position in the holder 9 the latter commences to tilt through the action of the wiper 51 on the projection 54. The tilting of the holder does not interfere with the engagement of the pallet with the lug 7 owing to the lateral extension 8 on the latter. By the time the pallet is properly positioned in the holder the latter has been tilted to the position shown in Fig. 3 and the drive is thrown out of gear in the manner already described. The attendant loads a mold of brick on the pallet and then tips the holder back to its normal position. The driving mechanism is again placed in gear by this action and the pallet is drawn from the holder to the table 12. As soon as the first pallet reaches the table a second pallet reaches its position in the holder and the machine stops as before. The elevator moves and elevates the pallet of bricks sufficiently to allow the next pallet of bricks to be placed in position on the table as soon as the mechanism is put in gear by the return of the pallet holder to its normal untilted position. As soon as the elevator is full the pallets of brick are lifted therefrom and taken away to the drying racks, preferably by a special truck which I have devised and which will form the subject matter of a separate application.

In order that the wiper 51 shall fall forward, after actuating the bell crank lever 31, sufficiently to insure that the projection 54 will be clearly behind it when the pallet holder is tilted back to normal position after being automatically tilted up, I preferably make the wiper loose on the shaft 34 and provide its hub with a projection engaging in the notch 55 in the collar 56 secured to the shaft. This notch is long enough to allow the wiper to fall forward as desired. The collars 28 and 29 are preferably connected by rods 57 having heads at one end and adjusting nuts at the other whereby the tension of the spring may be adjusted. These rods also serve to hold the lower collar in place while the spring prevents danger of breakage if the clutch teeth are not in proper position to engage at the time the clutch is shifted.

From the above description it will be seen that I have devised an apparatus which will satisfactorily accomplish the objects of my invention. I do not desire, however, to bind myself to the details of construction shown, as these may be departed from in many cases while retaining the same principle of operation.

What I claim as my invention is:—

1. In a pallet laying machine the combination of a pallet magazine; an endless carrier adapted to draw pallets one-by-one from said magazine; a tilting pallet holder into which the pallets are drawn; driving mechanism; a clutch in said driving mechanism; clutch shifting mechanism operated by said pallet holder whereby when the pallet holder is tilted from its normal horizontal position the driving mechanism is thrown out of gear; and means for automatically tilting the pallet holder when a pallet has been drawn into it by the carrier.

2. In a pallet laying machine the combination of a pallet magazine; an endless carrier adapted to draw pallets one-by-one from said magazine; a tilting pallet holder into which the pallets are drawn; driving mechanism; a clutch in said driving mechanism; clutch shifting mechanism operated by said pallet holder whereby when the pallet is tilted from its normal horizontal position the driving mechanism is thrown out of gear; means for automatically tilting the pallet holder when a pallet has been drawn into it by the carrier; a movable pallet receiving device and means for intermittently actuating said brick receiving device to carry away each pallet as it is fed to it.

3. In a pallet laying machine the combination of a pallet magazine; an endless carrier adapted to draw pallets one-by-one from said magazine; a pallet holder into which the pallets are drawn; a movable receiver to which the pallets are fed by the carrier after being drawn from the pallet holder; a drive shaft; intermittent gearing for imparting a step-wise movement to the carrier and the movable receiver adapted to move the carrier each time the movable receiver is stationary and vice versa; and a clutch connection between the drive shaft and the intermittent gear.

4. In a pallet laying machine the combination of a pallet magazine; an endless carrier adapted to draw pallets one-by-one from said magazine; a tilting pallet holder into which the pallets are drawn; a movable receiver to which the pallets are fed by the carrier after being drawn from the pallet holder; a drive shaft; intermittent gearing for imparting a step-wise movement to the carrier and the movable receiver adapted to move the carrier while the movable receiver is stationary and vice versa; a clutch connection between the drive shaft and the intermittent gear; and clutch shifting mechanism operated by said pallet holder whereby when the pallet is tilted from its normal horizontal position the driving mechanism is thrown out of gear.

5. In a pallet laying machine the combination of a pallet magazine; an endless carrier adapted to draw pallets one-by-one from said magazine; a tilting pallet holder into which the pallets are drawn; a movable receiver to which the pallets are fed by the carrier after being drawn from the pallet holder; a drive shaft; intermittent gearing for imparting a step-wise movement to the carrier and the movable receiver adapted to move the carrier while the movable receiver is stationary and vice versa; a clutch connection between the drive shaft and the intermittent gear; clutch shifting mechanism operated by said pallet holder whereby when the pallet is tilted from its normal horizontal position the driving mechanism is thrown out of gear; and means for automatically tilting the pallet holder when a pallet has been drawn into it by the carrier.

Toronto, Ont., this 25th day of July 1910.

BERTNEY C. HEATER.

Signed in the presence of—
J. Edw. Maybee,
E. P. Hall.